United States Patent [19]
Aizawa et al.

[11] Patent Number: 4,684,218
[45] Date of Patent: Aug. 4, 1987

[54] LIQUID CRYSTAL COLOR DISPLAY DEVICE HAVING TWO-LAYERED ELECTRODE WITH PINHOLE CONNECTIONS

[75] Inventors: Masandou Aizawa, Yokohama; Shigekazu Yamauchi, Sagamihara; Hisao Sekine; Takeshi Yamamoto, both of Yokohama, all of Japan

[73] Assignee: Stanley Electric Co., Ltd., Tokyo, Japan

[21] Appl. No.: 923,426

[22] Filed: Oct. 27, 1986

[30] Foreign Application Priority Data

Nov. 26, 1985 [JP] Japan .................................. 60-263851
Sep. 10, 1986 [JP] Japan .................................. 61-211508

[51] Int. Cl.$^4$ ............................................. G02F 1/13
[52] U.S. Cl. .................................. 350/339 F; 350/336
[58] Field of Search ............................ 350/336, 339 F

[56] References Cited

FOREIGN PATENT DOCUMENTS 59-222814 12/1984 Japan .................................. 350/336

OTHER PUBLICATIONS

"Crossed Guest-Host Liquid Crystal Display Employing Anisotropic Conductor Plate," *IBM Tech. Disc. Bull.*, vol. 28, No. 2 (Jul. 1985) pp. 473-474.

Kamikawa, "Double-Layer Electrode LCDs," *SID '80 Digest* (Apr. 1980) pp. 196-197.

*Primary Examiner*—John K. Corbin
*Assistant Examiner*—Richard F. Gallivan
*Attorney, Agent, or Firm*—Rosen, Dainow & Jacobs

[57] ABSTRACT

A liquid crystal color display device comprises: a two-layer structured transparent electrode in an identical pattern provided on a transparent substrate forming a liquid crystal; a color filter membrane disposed between said two-layered transparent electrodes by an electrically setting method; and a plurality of pinholes of a size less than 50 μm formed in a same number on each display part at the equal distance to each other in a smaller distance than the pitch between each display part, through which said first layer and second layer of the transparent electrode are electrically connected to each other.

The process for manufacturing the liquid crystal color display device comprises: forming a first layer electrode; forming photoresists and coating a color filter membrane; forming a plurality of pinholes in a dot form; forming a second layer transparent electrode through three steps of tentative, main and repeating baking treatments and connecting electrically the two layers of the electrode via the pinholes.

8 Claims, 13 Drawing Figures (a)

(b)

(a)

(b)

(a)

(b)

LIQUID CRYSTAL COLOR DISPLAY DEVICE HAVING TWO-LAYERED ELECTRODE WITH PINHOLE CONNECTIONS

BACKGROUND OF THE INVENTION (1) Field of the Invention

This invention relates to a liquid crystal color display device with a clear and contrasty display and its manufacturing process.

(2) Description of the Prior Art

Among conventional liquid crystal color display devices capable to present full colors, there is one kind shown in the Japanese Patent Official Gazette No. 60-88986. This device has a transparent signal electrode and a transparent scanning electrode on each opposing surface of two transparent substrates placed to oppose each other. The one transparent electrode at the signal electrode side is formed of a two-layer structure and color filters for red, green and blue are disposed by a dyeing method between the transparent two-layered electrodes. The two layer electrodes are connected in the areas other than the display area. By this method it has been possible to apply a same voltage to the electrode throughout the liquid crystal layer and to obtain a fresh and clear color display.

However, in such a conventional liquid color display device, thee has been a problem of inefficiency in high production volume due to the dissolving of the color filter membrane by the etching solution at the time of forming the color filter membrane in the dyeing method.

Furthermore, in the case of forming the second transparent layer electrode by a lift off method, there has been another problem of not being able to make the electrode membrane thick and lower the resistance of the electrode membrane in the actual manufacturing. In other words, there has been a problem that it is very difficult to lower the resistance value of the transparent electrode throughout the whole electrode.

SUMMARY OF THE INVENTION

Noticing this problem, it is a general object of this invention to provide a liquid crystal color display device which has a clear display contrast and its manufacturing process to produce efficiently in a high volume.

More specifically, the liquid crystal color display device of this invention is provided with two-layer structured transparent electrodes on the transparent substrate forming a liquid crystal, disposed with color filter membrane between the two-layer structured transparent electrodes, formed with a plurality of pinholes on said color filter membrane, and having the first and second layers of said transparent electrode connected each other through the pinholes.

Further, the manufacturing process for the liquid crystal color display device comprises the steps of: forming by a photo etching method a transparent first layer electrode on a transparent substrate of a liquid crystal cell; forming photoresists in a dot form on the transparent first layer electroe by a photo lithographic method and coating afterward a color filter membrane by an electrically setting method; forming a plurality of pinholes in a dot form on the color filter membrane by removing the photoresists after heating the transparent substrate within a tentative baking temperature in which said photoresists dissolve but the color filter membranes do not in the dissolving solution; heating the transparent substrate in the main baking temperature which hardens the color filter membrane formed with the pinholes; forming the second layer transparent electrode on the hardened color filter membrane by the photo etching method utilizing a photomask same as the one used for forming the first layer transparent electrode; and reheating the transparent substrate to strengthen the adherence of the color filter membrane and the two-layered transparent electrode connected electrically through said pinholes.

As explained above, the first layer and the second layer of transparent electrodes are electrically connected through a plurality of pinholes provided in the color filter membrane disposed between the two-layer structured transparent electrodes. For this reason, it is possible to apply an equal voltage throughout the whole areas of a liquid cell and as the result to obtain a color display, good in the display contrast.

Further, since the color filter membrane is coated by the electrically setting method and not dissolved by the photo etching solution at the time of forming the two layered transparent electrodes, the production efficiency is increased in a high volume production.

BRIEF DESCRIPTION OF THE ACCOMPANYING DRAWINGS

FIG. 4 is a sectional view showing the status that the first layer of electrode is formed.

FIG. 5 is a sectional view showing the status that it is coated with the photoresists.

FIG. 6 is a drawing showing an example of providing photoresists for pinholes on each electrode in line.

FIG. 7 is a drawing showing an example that the photoresists for the pinholes are placed in a distance interval smaller than a pitch between dot display parts.

FIG. 8 is a sectional view showing the status of the color filter membrane formed.

FIG. 9 is a sectional view showing the pinholes formed in the color filter membrane, and FIG. 10 is a sectional view showing the status that the second layered electrode are formed.

DETAILED DESCRIPTION OF PREFERRED EMBODIMENTS

A preferred embodiment of this invention will be described referring to the accompanying drawings.

Figure 1:
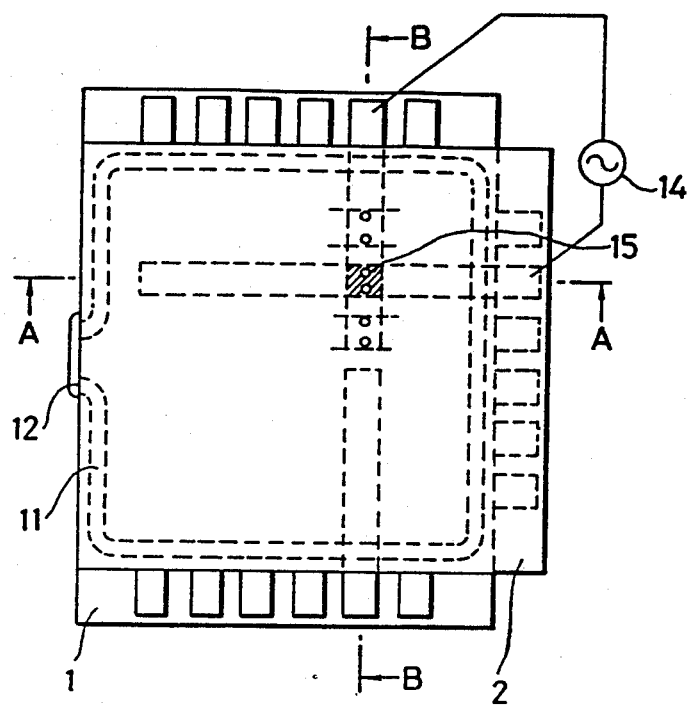
FIG. 1 is a view showing a major part of a liquid crystal color display device of this invention.
Figure 1:
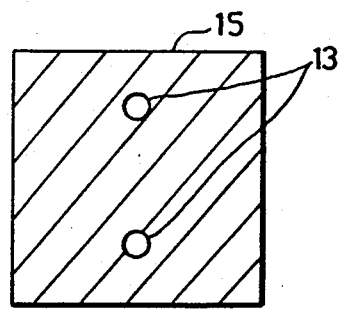
Figure 2:
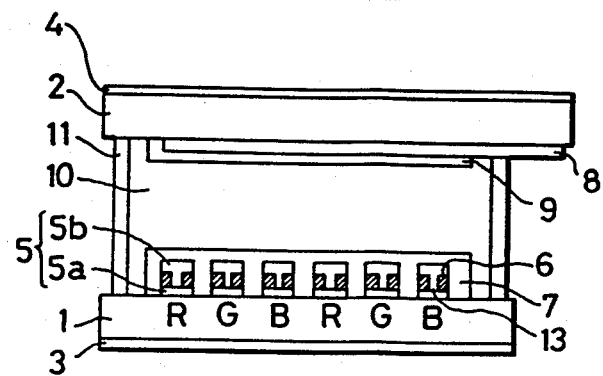
FIG. 2 is a structural view showing a sectional view at A—A of FIG. 1.
Figure 3:
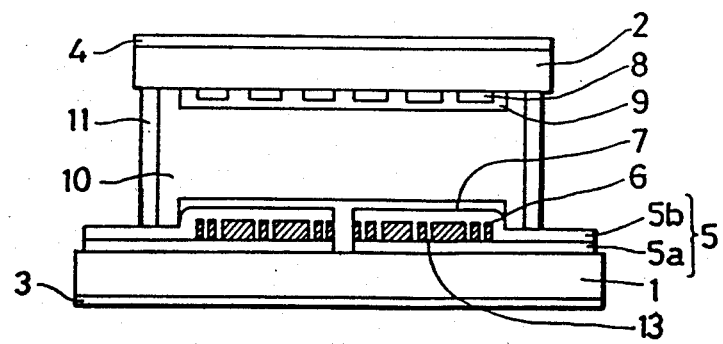
FIG. 3 is a structural view showing at B—B of FIG. 1.

FIG. 1 is a top view showing a major portion of the liquid crystal color display device of this invention, showing an embodiment of a color dot matrix display type. FIG. 2 and FIG. 3 show a sectional view at A—A line and a sectional view at B—B line of FIG. 1 respectively. In these drawings, 1 and 2 indicate glass substrates which are transparent substrates forming a liquid cell, which are provided with deflectors on each outside, and which are placed to be opposing each other. Further a two-layer structured transparent electrode 5 is fixed on one glass substrate 1 and color filter membranes of red (R), Green (G) and Blue (B) of three color elements are disposed between the first layer electrode 5a and the second layer electrode 5b, and on this transparent electrode 5 an orienting membrane 7 is provided.

Further, on the other glass substrate 2 a transparent electrode 8 functioning as a scanning electrode is fixed on the inner side and on the electrode 8, another orienting membrane 9 is provided.

Furthermore, a liquid crystal 10 is enclosed between both glass substrates 1 and 2 by a sealing material 11 and a sealing material for end 12.

A plurality of pinholes (through holes) 13 are formed in said color filter membranes 6. The first layer electrode 5a and the second layer electrode 5b are connected electrically to each other through said pinholes. Further, on applying alternative voltage to the two-layered transparent electrode 5 and the other transparent electrode 8 from an alternative current electric source 14, dot display parts 15 show dot display, and as a result, the desired color image is to be displayed throughout the whole area. A plurality of pinholes 13 are provided to each dot display part 15 (2 dots in the drawing). However, a backward illumination is required to have a good color display at this time.

In the liquid crystal color display device of dot matrix type, as explained above, color filter membrane 6 are provided, corresponding to the dot display part 15, and a plurality of pinholes 13 are formed in the color filter membranes 6. The first layer and the second layer of the two-layer structured transparent electrodes 5 of the signal side are electrically connected to each other by these pinholes.

For this reason, the electric resistance value of the signal electrode is a parallel resistance value resulting from the parallel connection of the first layer and the second layer electrode 5a and 5b. The first layer transparent electrode 5 could be formed of sufficiently low electric resistance at the time of heat treating before forming the color filter membrane 6 and this could compensate a limitation that the heat treatment of the second layer electrode 5b could be done only within the maximum heat endurance of the color filter membrane 6. That is, in other words, the fact that the resistance value of the second layer electrode 5b could not be lowered sufficiently could be compensated by sufficiently lowering the resistance value of said parallel connection. Accordingly, it is possible to obtain a highly contrasting good clear color display by having a sufficiently low resistance value through the Tip of the signal electrode and as the result enabling to apply an equal working voltage to the electrodes throughout the whole area.

Further, a variance of the working voltage could be avoided by the construction of the color filter membranes 6 locating under the second layer electrode 5b and which is without being influenced by the static capacity of the color filter membrane 6. Accordingly a variance in the color are eliminated and so a clear color display image is obtained.

Here, the color filter membranes 6 could be formed in the areas other than dot display parts 15 also. Providing the pinholes 13 therein, the first layer and the second layer electrodes 5a and 5b could be connected to each other. From this case, a better image is obtained because there are not created the pinholes 13 in the dot display parts 15. It will be further better if the diameter of pinholes is less than 50 μm since 50 μm is a size invisible to human eyes and does not hinder the effectiveness of display. Further, a clear color image could be obtained also without hurting display effect by arranging the pinholes 13 in an equal distance to each other and specifically in a smaller distance than the distance between the display parts 15.

Next, processes for manufacturing the liquid crystal color display device constructed as above are explained as follows:

A process for manufacturing the two-layer structured transparent electrode 5 will be explained mainly referring to FIG. 4 to FIG. 10 in the numerical order.

(1)

Figure 4:
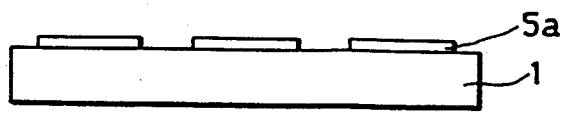
FIG. 4–FIG. 10 are the drawings showing the manufacturing processes.

First, after having been formed a transparent electric conductive membrane (ITO etc.) on a glass substrate 1 forming a liquid cell by a method such as a spattering method etc., a first layer electrode 5a is to be formed by photo etching method (Refer to FIG. 4).

(2)

Figure 5:
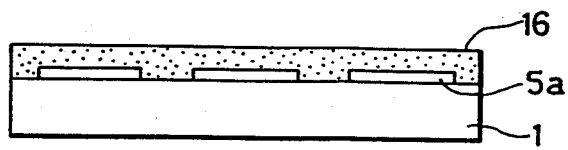

A photoresist 16 is coated on the first layer electrode 5a by a tool such as roll coater (Refer to FIG. 5).

(3)

Figure 6:
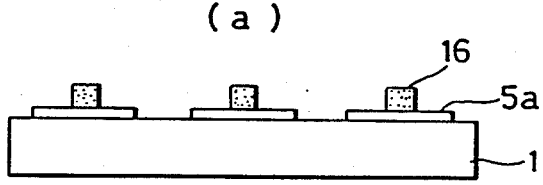
Figure 6:
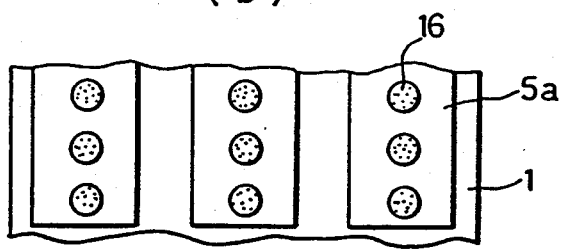

Said photoresists 16 is formed in a dot form (of desired pinhole size) by a photolithographic method. In this time, as shown in FIG. 6, in case of forming a line of pinholes 13 with every electrode, a photolithographic technique to use mask alignment will be needed. In this case, both the rates of light going through each dot display part 15 and the resistance values between the first and the second layer electrode 5a, 5b will be equal. FIG. 6(a) is a sectional view, and FIG. 6(b) is a top view.

Figure 7:
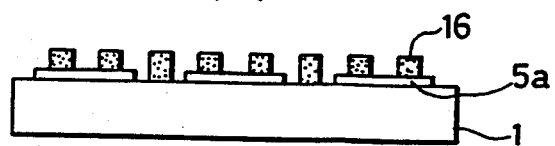
Figure 7:
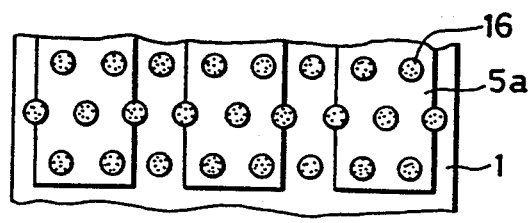
Figure 8:
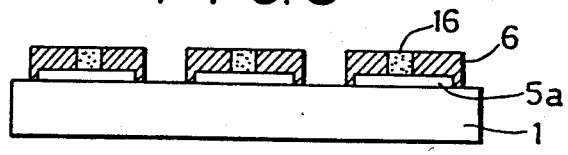
Figure 9:
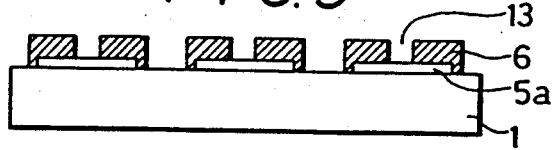

Futher, as shown in FIG. 7, it is acceptable to make the distance between the pinholes equal to each other, and to make it smaller than the distance of pitch between the dot display parts 15. In this case, it is unnecessary to make mask alignment to form the pinholes 13, and yet it is possible to minimize a variance in the rate of light going through and in the value of electrode connection resistances. FIG. 7(a) is a sectional view and FIG. 7(b) is a top view.

(4)

A color filter membrane 6 is coated on the first layer electrode 5a provided with photoresists 16 by the method of a well known electrically setting method (for example, refer to Japanese Opened Patent No. 59-90818 Official Gazette) (Refer to FIG. 8) In this process, photoresists 16 of the color filter membranes 6 are not coated because they are electrically insulated at this time.

(5)

After the glass substrate 1 being heated in a tentative baking temperature where the photoresists 16 dissolve but the color filter membranes do not in the peel off solution and the photoresists 16 being peeled off, a plurality of said pinholes in a dot form 13 are formed in the color filter membranes 6. (Refer to FIG. 9).

In this process, the reason for heating the glass substrate 1 in a tentative baking temperature is for hardening tentatively the color filter membranes 6. Experimental data showing the most appropriate conditions for tentative baking are shown in Table 1.

TABLE 1

| Tentative Baking Temp. | Time | Evaluation | Degree of Peeling off |
|---|---|---|---|
| 70° C. | 0.5 hour | not good | Color filter mem. off |
| 80° C. | 0.5 hour | accepted | Color filter mem. partially off |
| 100° C. | 0.5 hour | good | Only photoresists off |
| 120° C. | 0.5 hour | good | Only photoresists off |
| 140° C. | 0.5 hour | not good | Photoresists |

TABLE 1-continued

| Tentative Baking Temp. | Time | Evaluation | Degree of Peeling off |
|---|---|---|---|
|  |  |  | breakdown. not off |

It is understood from Table 1 that the best condition is to bake for 0.5 hour or more at a temperature between 80° C.–130° C.

Further, the temperature of the peel off solution is maintained at 40° C. and the time for soaking is 5 minutes.

(6)

The glass substrate 1 is to be baked at a main baking temperature to harden the color filter membranes 6 formed with the pinholes 13. Experimental data indicating the best control conditions for the main baking are shown in Table 2.

TABLE 2

| Main baking temp. | Time | Evaluation | Status after the process |
|---|---|---|---|
| 160° C. | 1 hour | not acceptable | second layer electrode peel off in cleaning process |
| 170° C. | 1 hour | good | good |
| 200° C. | 1 hour | good | good |
| 220° C. | 1 hour | good | good |
| 230° C. | 1 hour | not acceptable | fading color filter membrane |

It will be understood the best conditions are heating at a main baking temperature of 170° C.–220° C. for more than 1 hour.

(7)

Figure 10:
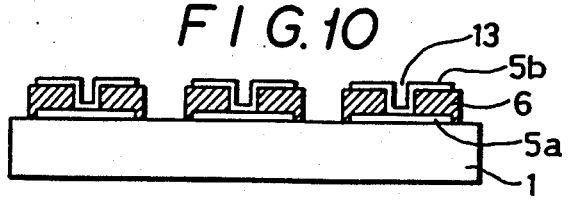

The next process is to form a second layer electrode 5b on said hardened color filter membranes 6 employing a photo mask in a manner same as in the first layer electrode 5a (Refer to FIG. 10). In this process, as well as in the first layer case, first a transparent electro conductive membranes are formed, and next second layer is to be formed. This time, since the photo mask is the same mask used for the first layer case, the cost of masking will be saved, and it is easy to obtain a highly precise alignment. Further, the electrode is constructed of two-layered structure electrically connected to each other between the first layer and the second layer electrode 5a and 5b via the pinholes 13.

(8)

The glass substrate 1 is to be reheated at an adhering temperature for the purpose of adhering the second layer electrode 5b and color filter membrane 6. Table 3 shows the best conditions for adherence treatment.

TABLE 3

| Reheating treatment temperature | time | evaluation | status after second electrode |
|---|---|---|---|
| 90° C. | 0.5 h | not acceptable | peel off in cleaning |
| 100° C. | 0.5 h | good | good |
| 200° C. | 0.5 h | good | good |
| 220° C. | 0.5 h | good | good |
| 230° C. | 0.5 h | not acceptable | fading of color filter membrane |

From Table 3 it is understood that the best conditions for the adherence treatment will be heat at 100° C.–220° C. for 0.5 hour or more.

The color substrates having the two-layer structured signal electrode are formed as mentioned above. The process after this is same as processes for the ordinary dot matrix liquid crystal cell and this dot matrix color display device is manufactured through the same processes. At this time, since the color filter membrane 6 are formed by the electrically setting method, the color filter membrane 6 are prevented from getting peeled off during the photoetching process mentioned in (7). As the result, it is possible to increase the volume production efficiency. Further, since the transparent electrically conductive membranes for the second layer are formed thick by the spattering method, the resistance value could be lowered, also. Accordingly, a clear color image with a good contrast could be obtained easily.

Further, through the liquid color display device in the dot matrix display method is explained as the embodiment of this invention, it is needless to say that this invention could be applicable to the ordinary liquid color display.

As explained above, according to this invention, there is an effect that a clear color image with a good contrast could be obtained by connecting the first layer and the second layer of the two-layer structured electrode to each other via a plurality of pinholes provided in the color filter membranes and there is another effect that the volume production efficiency improved by forming the color filter membranes by the electrically setting method.

What is claimed is:

1. A liquid crystal color display device comprising: a two-layer structured transparent electrodes in an identical pattern provided on a transparent sustrate forming a liquid crystal; color filter membranes disposed between said two-layered transparent electrodes by an electrical setting method; and a plurlaity of pinholes formed on said color filter membrane, through which said first layer and second layer transparent electrodes are electrically connected to each other.

2. A liquid crystal color display device as claimed in claim 1 in which said pinholes are provided in a same number on each display part laminated on said transparent electrode and color filter membranes.

3. A liquid crystal color display device as claimed in claim 1 in which said pinholes are provided at an equal distance to each other and said distance is smaller than the distance between each display part.

4. A liquid crystal color display device as claimed in claim 1 or 3 in which said pinholes are in the size of less than 50 μm in diameter.

5. A process for manufacturing a liquid crystal color display device comprising the steps of:
forming by a photoetching method a first layer electrode on a transparent substrate of a liquid crystal cell;
forming photoresists in a dot form on the first layer transparent electrode by a photolithographic method and coating a color filter membrane afterward by an electric setting method;
forming a plurality of pinholes in a dot form on the color filter membranes by removing the photoresists after heating the transparent substrate within a tentative baking temperature in which said photoresists dissolve but the color filter membranes do not dissolve in the dissolving solution; heating the substrate at the main baking temperature which hardens the color filter membranes formed with pinholes;

forming a second layer transparent electrode on the hardened color filter membranes by the photoetching method utilizing a photo mask the same as the one used for forming the first layer transparent electrode;

and the two-layered transparent electrodes being connected electrically through said pinholes.

6. a process for manufacturing a liquid crystal color display device as claimed in claim 5 in which said tentative baking conditions of the transparent substrate are to heat at 80° C.–130° C. of the tentative baking temperature for more than 0.5 hour.

7. A process for manufacturing a liquid crystal color display device as claimed in claim 5 or 6 in which said main baking conditions of the transparent substrate are to heat at 170° C.–220° C. of main baking temperatures for more than 1 hour.

8. A process for manufacturing a liquid crystal color display device as in claim 7 in which reheating conditions for adhering the transparent electrode and the color filter membranes are to heat at 100° C.–220° C. of adherence treatment temperature for more than 0.5 hour.

* * * * *